(12) United States Patent
Jakubowski et al.

(10) Patent No.: US 7,080,249 B1
(45) Date of Patent: Jul. 18, 2006

(54) CODE INTEGRITY VERIFICATION THAT INCLUDES ONE OR MORE CYCLES

(75) Inventors: Mariusz H. Jakubowski, Bellevue, WA (US); Ramarathnam Venkatesan, Redmond, WA (US); Yacov Yacobi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 852 days.

(21) Appl. No.: 09/670,916

(22) Filed: Sep. 29, 2000

Related U.S. Application Data (60) Provisional application No. 60/199,622, filed on Apr. 25, 2000.

(51) Int. Cl.
    *G06F 1/26* (2006.01)
(52) U.S. Cl. .................. 713/165; 713/167; 713/181
(58) Field of Classification Search ................ 713/165, 713/167, 181, 200–201; 709/223–226, 229
    See application file for complete search history.

(56) References Cited

U.S. PATENT DOCUMENTS 5,754,658 A * 5/1998 Aucsmith .................... 380/28
5,761,301 A * 6/1998 Oshima et al. ................ 705/57
6,654,888 B1 * 11/2003 Cooper et al. .............. 713/190
6,735,311 B1 * 5/2004 Rump et al. ................ 380/231
6,738,906 B1 * 5/2004 Hippelainen ................ 713/200

OTHER PUBLICATIONS

Aucsmith; "Tamper Resistant Software: An Implementation", Information Hiding: First International Workshop (Lecture Notes in Computer Science), vol. 1174, Ross Anderson, Editor, 1996, pp. 317-333.

* cited by examiner

*Primary Examiner*—Thomas R. Peeso
(74) *Attorney, Agent, or Firm*—Lee & Hayes, PLLC (57) ABSTRACT

Cyclic verification of code integrity is applied to an object by identifying multiple segments of the object. Each segment is separated into multiple blocks, and a message authentication code (MAC) value of each of these segments is computed. The computed module MAC values are then incorporated into selected ones of the multiple segments (referred to here as "checker segments"), which may also have their MAC values incorporated into other checker segments. A new MAC value for each of the checker segments is then calculated. A new block is added to each of the checker segments that results in restoring the MAC value of the checker segment back to its original value. Thus, the checker segments can be subsequently verified based on the MAC values stored in other segments.

44 Claims, 7 Drawing Sheets

CODE INTEGRITY VERIFICATION THAT INCLUDES ONE OR MORE CYCLES

RELATED APPLICATIONS

This application claims the benefit of U.S. Provisional Application No. 60/199,622, filed Apr. 25, 2000, entitled "Cyclic Verification of Code Integrity" to Mariusz H. Jakubowski, Ramarathnam Venkatesan, and Yacov Yacobi.

TECHNICAL FIELD

This invention relates to protecting digital objects, such as software.

BACKGROUND

Digital content (e.g., software, firmware, etc.) are often distributed to consumers via fixed computer readable media, such as a compact disc (CD-ROM), digital versatile disc (DVD), soft magnetic diskette, or hard magnetic disk (e.g., a preloaded hard drive). More recently, more and more content is being delivered in digital form online over private and public networks, such as Intranets and the Internet. Online delivery improves timeliness and convenience for the user, as well as reduces delivery costs for a publisher or developers. Unfortunately, these worthwhile attributes are often outweighed in the minds of the publishers/developers by a corresponding disadvantage that online information delivery makes it relatively easy to obtain pristine digital content and to pirate the content at the expense and harm of the publisher/developer.

One concern of the publisher/developer is the ability to check digital content, after distribution, for alteration. Such checking, is often referred to as SRI (Software Resistance to Interference). The desire to check for such alterations can vary (e.g., to ensure that the content continues to operate as intended by the publisher/developer, to protect against improper copying, etc.).

The unusual property of content is that the publisher/developer (or reseller) gives or sells the content to a client, but continues to restrict rights to use the content even after the content is under the sole physical control of the client. For instance, a software developer typically sells a limited license in a software product that permits a user to load and run the software product on one or more machines (depending upon the license terms), as well as make a back up copy. The user is typically not permitted to make unlimited copies or redistribute the software to others.

Such scenarios reveal a peculiar arrangement. The user that possesses the digital bits often does not have fill rights to their use; instead, the provider retains at least some of the rights.

One of the uses for SRI is to provide "digital rights management" (or "DRM") protection to prevent unauthorized distribution of, copying and/or illegal operation of, or access to the digital content. An ideal digital content distribution system would substantially prevent unauthorized distribution/use of the digital content. Digital rights management is fast becoming a central requirement if online commerce is to continue its rapid growth. Content providers and the computer industry must quickly address technologies and protocols for ensuring that digital content is properly handled in accordance with the rights granted by the developer/publisher. If measures are not taken, traditional content providers may be put out of business by widespread theft or, more likely, will refuse altogether to deliver content online.

Various DRM techniques have been developed and employed in an attempt to thwart potential pirates from illegally copying or otherwise distributing the digital goods to others. For example, one technique includes requiring or otherwise encouraging the consumer to register the digital content with the provider, for example, either through the mail or online via the Internet or a direct connection. Thus, the digital content may require the consumer to enter a registration code before allowing the digital content to be fully operational or fully accessed. Unfortunately, such techniques are not always effective since unscrupulous individuals/organizations need only break through or otherwise undermine the protections in a single copy of the digital content. Once broken, copies of the digital good can be illegally distributed, hence such techniques are considered to be Break-Once, Run-Everywhere (BORE) susceptible.

Accordingly, there remains a need for a technique that addresses the concerns of the publisher/developer, allowing alteration of the digital content to be identified to assist in protecting the content from many of the known and common attacks, but does not impose unnecessary and burdensome requirements on legitimate users.

SUMMARY

Code integrity verification that includes one or more cycles is described herein.

According to one aspect, an object to be protected is separated into multiple modules, any one or more of which can include a checkpoint and corresponding checkpoint value that can be used to verify the integrity of any one or more other modules. Each module is then separated into multiple blocks, and a message authentication code (MAC) value of each of these modules is computed (based on the blocks within the module). The computed module MAC values are then incorporated into selected ones of the multiple modules (referred to here as "checker modules"). Incorporating the calculated MAC values into the checker modules will alter the content of the checker modules, and thus alter the previously calculated MAC values for those checker modules. Thus, a new MAC value for each of the checker modules is calculated. For each of the checker modules, a new block is also added having content that results in restoring the MAC value of the checker module back to its original value (the content for the new block is determined based on the MAC function and the new MAC values). Thus, the checker modules can be subsequently verified based on the MAC values stored in other modules.

BRIEF DESCRIPTION OF THE DRAWINGS

The same numbers are used throughout the drawings to reference like elements and features.

DETAILED DESCRIPTION

A digital content distribution architecture produces and distributes content (also referred to as objects) in a fashion that provides resistance to interference with the content. The content can be made resistant to interference in any of a wide variety of situations, such as any time the publisher/developer of the content desires to make it difficult to alter the content. The distribution architecture provides such resistance to the content by manipulating the content to allow portions to include information that can be used to verify the integrity of other portions (e.g., to verify that they have not been altered). This architecture is particularly useful for verifying the integrity of code, such as software code or firmware code. For discussion purposes, many of the examples are described in the context of software code, although the techniques described herein are effective for non-software code as well.

Distribution Architecture

Figure 1:
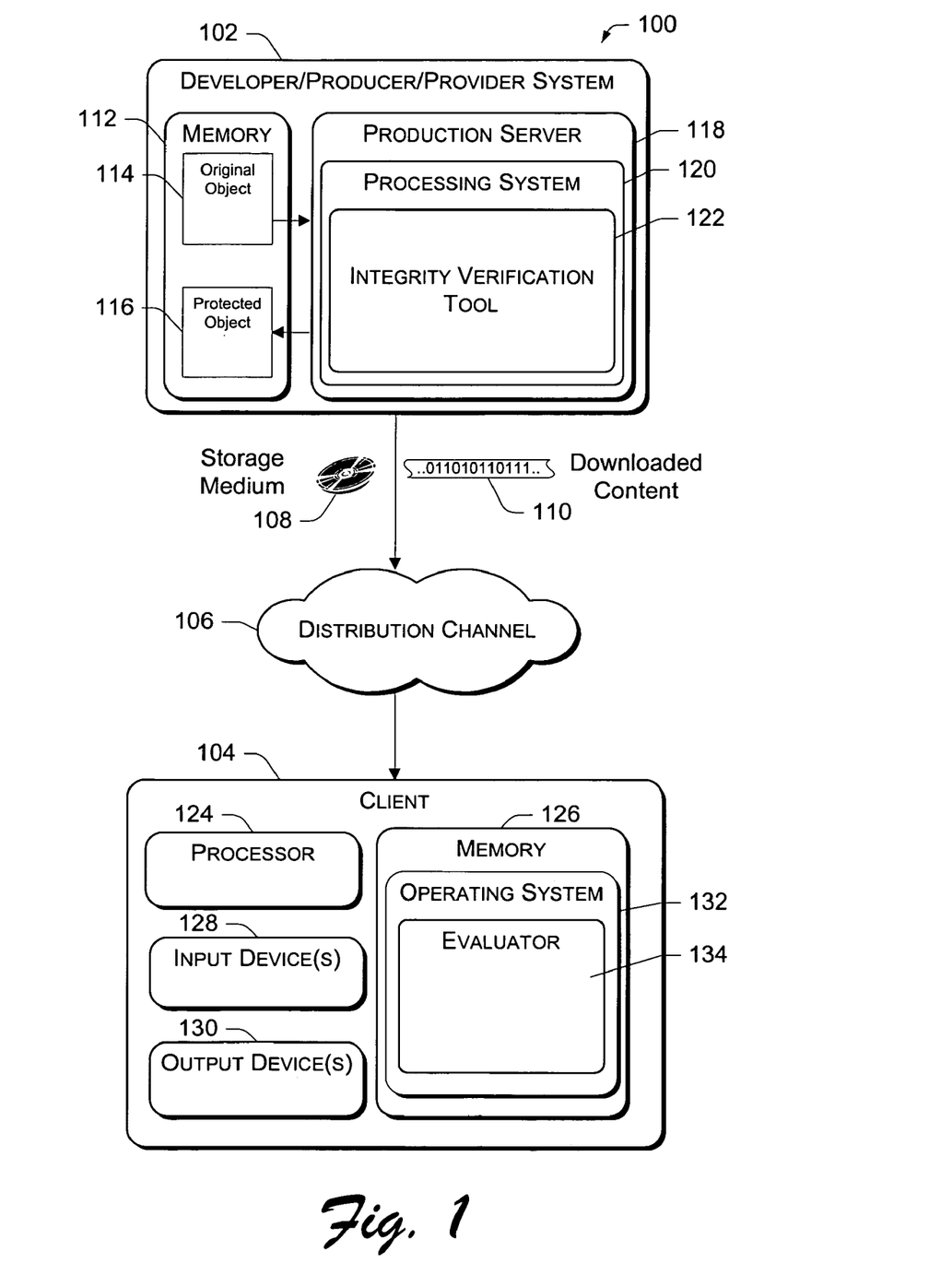
FIG. 1 illustrates an exemplary distribution architecture in which objects (e.g., software or firmware code) are transformed into protected digital objects and distributed in their protected form.

FIG. 1 illustrates an exemplary distribution architecture 100 in which objects (e.g., software or firmware code) are transformed into protected digital objects and distributed in their protected form. One specific example of architecture 100 is a digital rights management (DRM) distribution architecture that renders the content resistant to many known forms of attack. Architecture 100 has a system 102 that develops or otherwise produces the protected object and distributes the protected object to a client 104 via some form of distribution channel 106. The protected digital objects may be distributed in many different ways. For instance, the protected digital objects may be stored on a computer-readable medium 108 (e.g., CD-ROM, DVD, floppy disk, etc.) and physically distributed in some manner, such as conventional vendor channels or mail. The protected objects may alternatively be downloaded over a network (e.g., the Internet) as content or files 110.

Developer/producer system 102 has a memory 112 to store an original object 114, as well as protected object 116 created from the original object. System 102 also has a production server 118 that transforms original object 114 into protected object 116 that is suitable for distribution. Production server 118 has a processing system 120 and implements an integrity verification tool 122. Generally speaking, integrity verification tool 122 automatically parses original object 114 and modifies object 114 for cyclic integrity verification into the code to produce protected object 116.

Original object 114 represents the code as originally produced, without any protection or code modifications. Protected object 116 is a unique version of the software product or data after the cyclic integrity verification has been inserted into the code. Protected object 116 is functionally equivalent to and derived from original object 114, but is modified to enable the client to determine whether the product has been tampered with.

Developer/producer system 102 is illustrated as a single entity, with memory and processing capabilities, for ease of discussion. In practice, however, system 102 may be configured as one or more computers that jointly or independently perform the tasks of transforming the original object into the protected object.

Client 104 has a processor 124, memory 126 (e.g., RAM, ROM, Flash, hard disk, CD-ROM, etc.), one or more input devices 128 (e.g., keyboard, joystick, voice recognition, etc.), and one or more output devices 130 (e.g., monitor, speakers, etc.). The client may be implemented as a general purpose computing unit (e.g., desktop PC, laptop, etc.) or as other devices, such as set-top boxes, audio/video appliances, game consoles, and the like. Processor 124 can optionally be a "secure" processor that supports various security features, such as a certificate for use in cryptography, a unique processor id or serial number, etc.

Client 104 runs an operating system 132, which is stored in memory 126 and executed on processor 124. Operating system 132 represents any of a wide variety of operating systems, such as a multi-tasking, open platform system (e.g., a "Windows"-brand operating system from Microsoft Corporation). The operating system 132 includes an evaluator 134 that evaluates the protected objects to determine whether the protected objects have been tampered with or modified in any manner. This evaluation can be performed at different times, such as prior to loading and execution, during execution, etc., and can be based on the shape of the code and/or the behavior of the code. Evaluators 134 on different clients 104 can be configured to perform this evaluation at different times, or alternatively an evaluator 134 on a single client 104 can be configured to perform this evaluation at different times (e.g., prior to loading and execution as well as during execution).

The protected object may have multiple security checks that operate to ensure that client 104 is authorized to execute the protected object. By way of example, a check for the existence of a secret key(s) within the object, for the existence of a CD-ROM, for the existence of a watermark, etc. If a pirate or other malicious user were to attempt to modify the code so that such a check were not performed, the code integrity verification process would detect that the code had been modified and take appropriate action in response.

Some protection schemes involve executing instructions, analyzing data, and performing other tasks in the most secure areas of the operating system 132 and processor 124. Accordingly, the evaluator 134 includes code portions that may be executed in these most secure areas of the operating system and secure processor. Although the evaluator 134 is illustrated as being integrated into the operating system 132, it may be implemented separately from the operating system.

In the event that the client detects some tamper activity, processor 124 acting alone, or together with operating system 132, may decline to execute the suspect digital object. For instance, the client may determine that the software product is an illicit copy because the evaluations performed by evaluator 134 are not successful. In this case, the evaluator 134 informs processor 124 and/or operating system 132 of the suspect code and processor 124 may decline to run that software product, if already running then operating system 132 or processor 124 may terminate execution of the software product, operating system 132 may notify an administrator, etc.

It is further noted that operating system 132 may itself be the protected object. That is, operating system 132 may be modified to implement a code integrity verification process to produce a product that makes it easy to detect such copying. In this case, processor 124 may be configured to detect an improper version of the operating system during the boot process (or at other times) and prevent the operating system from fully or partially executing and obtaining control of system resources.

Alternatively, a protected object itself may perform the evaluation rather than evaluator 134. In this situation, the protected object includes one or more sets of instructions that can be executed to verify its own integrity, and then inform processor 124 and/or operating system 132 in the event of an integrity verification failure.

For protected objects delivered over a network, the client 104 implements tamper-resistant software (not shown) to connect to server 102 using an SSL (secure sockets layer) or other secure and authenticated connection to purchase, store, and utilize the object. The objected may be encrypted using well-known algorithms (e.g., RSA) and compressed using well-known compression techniques (e.g., ZIP, RLE, etc.).

Figure 2:
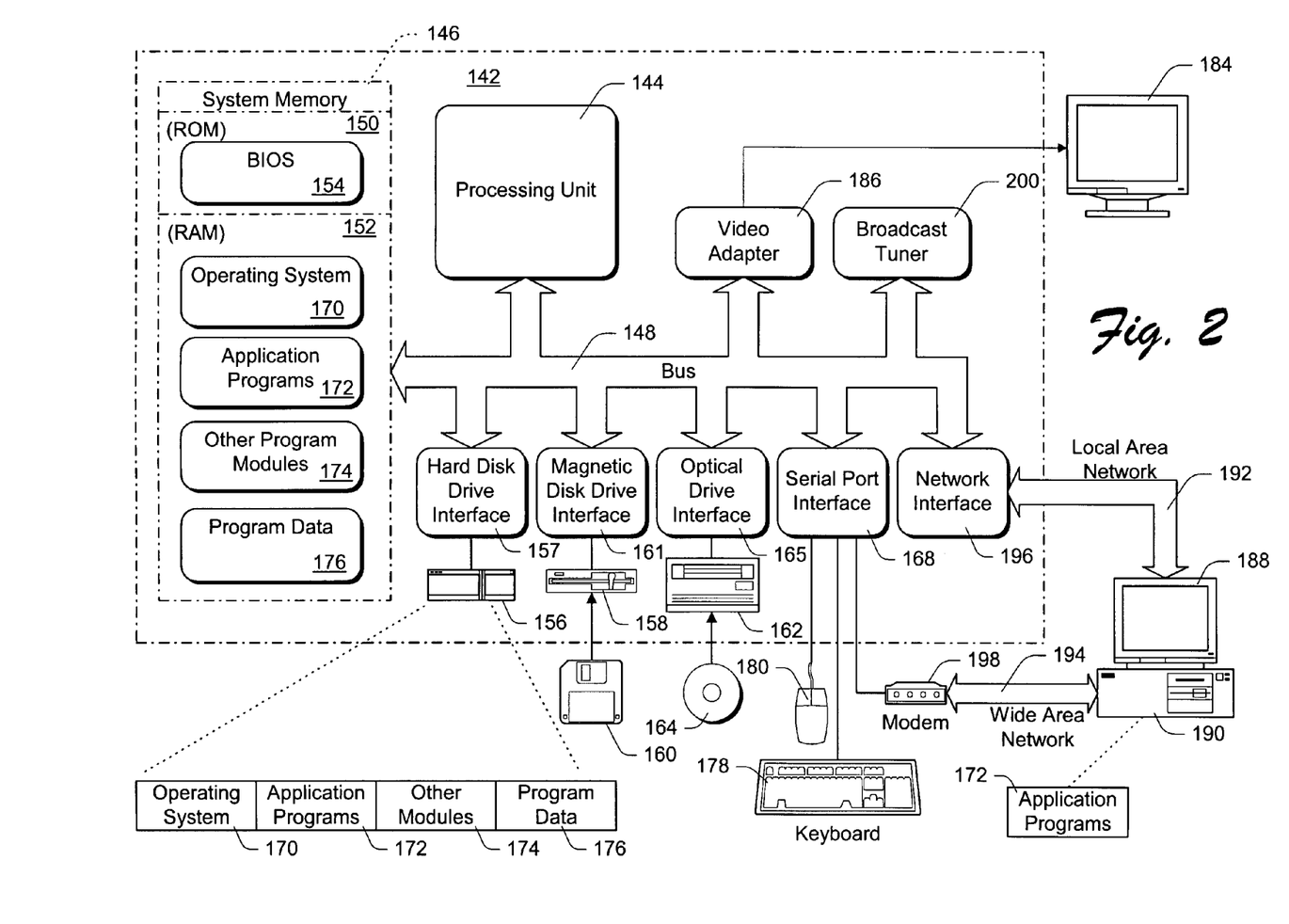
FIG. 2 shows a general example of a computer that can be used in accordance with certain embodiments of the invention.

FIG. 2 shows a general example of a computer 142 that can be used in accordance with certain embodiments of the invention. Computer 142 is shown as an example of a computer that can perform the functions of developer/producer system 102 or client 104 of FIG. 1.

Computer 142 includes one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150.

Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 (e.g., a serial port interface) that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 optionally operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other component for establishing communications over the wide area network 194, such as the Internet. The modem 198, which may be internal or external, is connected to the system bus 148 via an interface (e.g., a serial port interface 168). In a networked environment, program modules depicted relative to the personal computer 142, or portions thereof, may be stored in the remote memory storage device. It is to be appreciated that the network connections shown are exemplary and other means of establishing a communications link between the computers may be used.

Computer 142 also optionally includes one or more broadcast tuners 200. Broadcast tuner 200 receives broadcast signals either directly (e.g., analog or digital cable transmissions fed directly into tuner 200) or via a reception device (e.g., via antenna 110 or satellite dish 114 of FIG. 1).

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
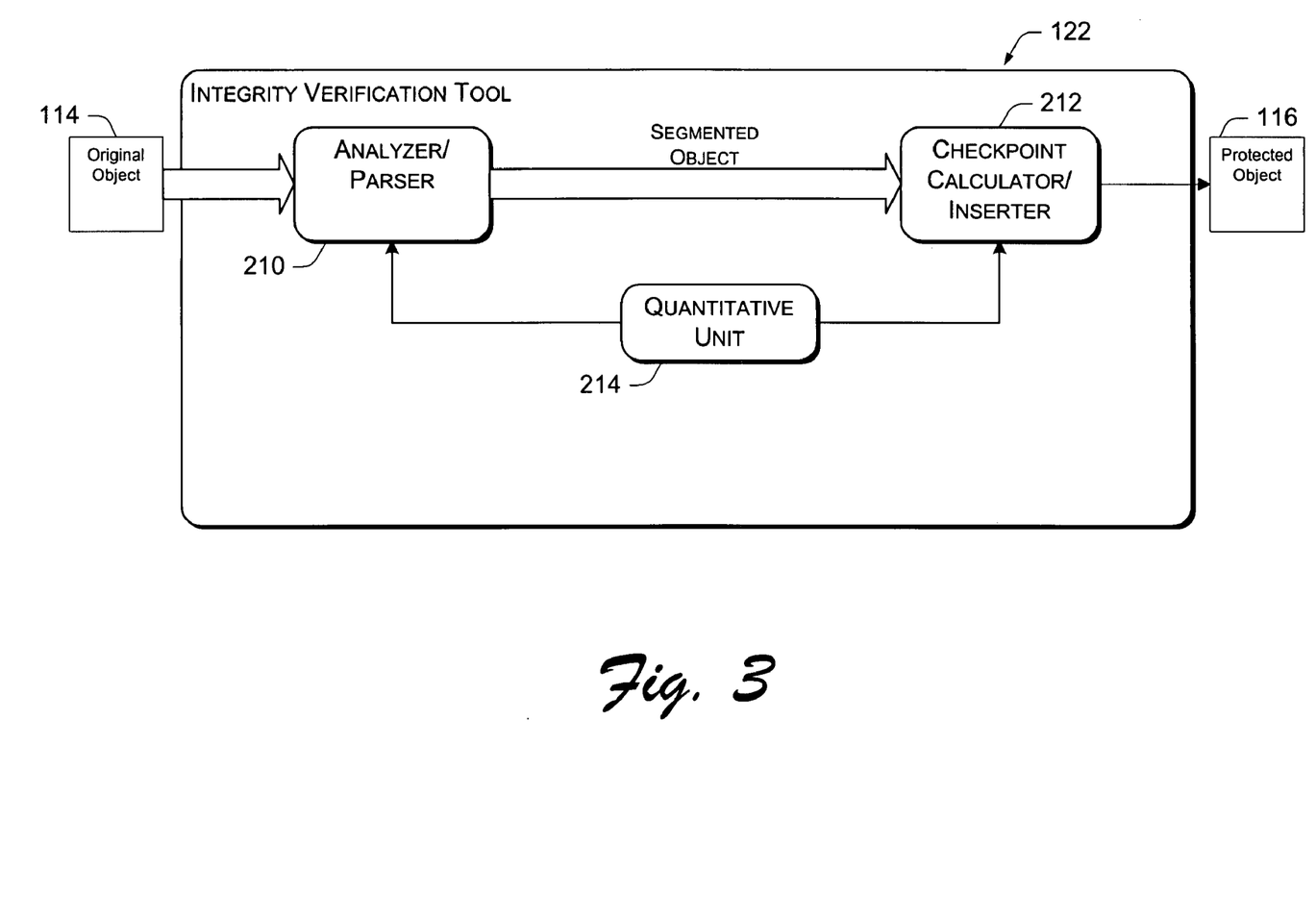
FIG. 3 shows an exemplary integrity verification tool implemented by a production server in more detail.

FIG. 3 shows an exemplary integrity verification tool 122 implemented by production server 118 of FIG. 1 in more detail. Integrity verification tool 122 is configured to transform an original object 114 into a protected object 116. The transformation process is usually applied just before the object is released to manufacture or prior to being downloaded over a network. The process is intended to produce an object that is protected from various forms of attack and illicit copying activities. Integrity verification tool 122 may be implemented in software, firmware, hardware, or a combination thereof.

Integrity verification tool 122 includes an analyzer 210 that analyzes the original object 114 and parses it into multiple segments (also referred to herein as modules). Analyzer 210 may attempt to intelligently segment the object along natural boundaries inherent in the object, such as by parsing the code according to logical groupings of instructions, such as routines, or sub-routines, or instruction sets. Alternatively, analyzer 210 may segment the object without regard for the natural boundaries, such as randomly or by using one or more programmed (or pre-determined) segment sizes.

In one specific implementation for analyzing software code, analyzer 210 is configured as a software flow analysis tool that converts the software program into a corresponding flow graph. The flow graph is partitioned into many clusters of nodes. The segments may then take the form of sets of one or more nodes in the flow graph. For more information on this technique, the reader is directed to co-pending U.S. patent application Ser. No. 09/525,694, entitled "A Technique for Producing, Through Watermarking, Highly Tamper-Resistant Executable Code and Resulting "Watermarked" Code So Formed", which was filed Mar. 14, 2000, in the names of Ramarathnam Venkatesan and Vijay Vazirani. This Application is assigned to Microsoft Corporation and is hereby incorporated by reference.

Integrity verification tool 122 also includes a checkpoint calculator/inserter 212 that generates and inserts checkpoint values into the segments or modules of the object. As discussed in more detail below, the checkpoint value for a particular module is a verification value (also referred to as a checksum value) based on the content of that module and may be modified due to checkpoint values for other modules. Checkpoint calculator/inserter 212 outputs the protected object 116 that is ready for mass production and/or distribution.

Checkpoints and corresponding checkpoint values can be inserted into segments of the code to verify the integrity of any one or more segments of the code. This ability to verify the integrity of any segment can result in cycles of integrity verification being created. For example, segment A may verify the integrity of segment B, which in turn verifies the integrity of segment A. One or more such cycles can be established within the code, and segments can belong to multiple cycles. Continuing with the previous example, segment B may also verify the integrity of segment C, which in turn verifies the integrity of segment B (and may or may not also verify the integrity of segment A).

Integrity verification tool 122 may further be configured with a quantitative unit 214 that enables a producer/developer to define how much protection should be applied to the original object. For instance, the producer/developer might elect to set the number of checkpoints (e.g., 500 or 1000) added to the object as a result of the protection, or define a maximum number of lines/bytes of code that are added for protection purposes. Quantitative unit 214 may include a user interface (not shown) that allows the user to enter parameters defining a quantitative amount of protection.

Quantitative unit 214 provides control information to analyzer 210 and checkpoint calculator/inserter 212 to ensure that these components satisfy the specified quantitative requirements. Suppose, for example, the producer/developer enters a predefined number of checkpoints (e.g., 500). With this parameter, analyzer 210 ensures that there are a sufficient number of segments (e.g., at least 500), and checkpoint calculator/inserter 212 ensures that the resulting number of checkpoints approximates 500.

In some situations, care should be taken in selecting the number of checkpoints that are included in an object. If the number of checkpoints becomes too large, then various statistical indicators of the object's operation (e.g., payload control graphs, data graphs, etc.) can become abnormal. Such abnormalities can provide indicators to malicious users as to where certain checkpoints are located within an object and assist them in removing such checkpoints.

Figure 4:
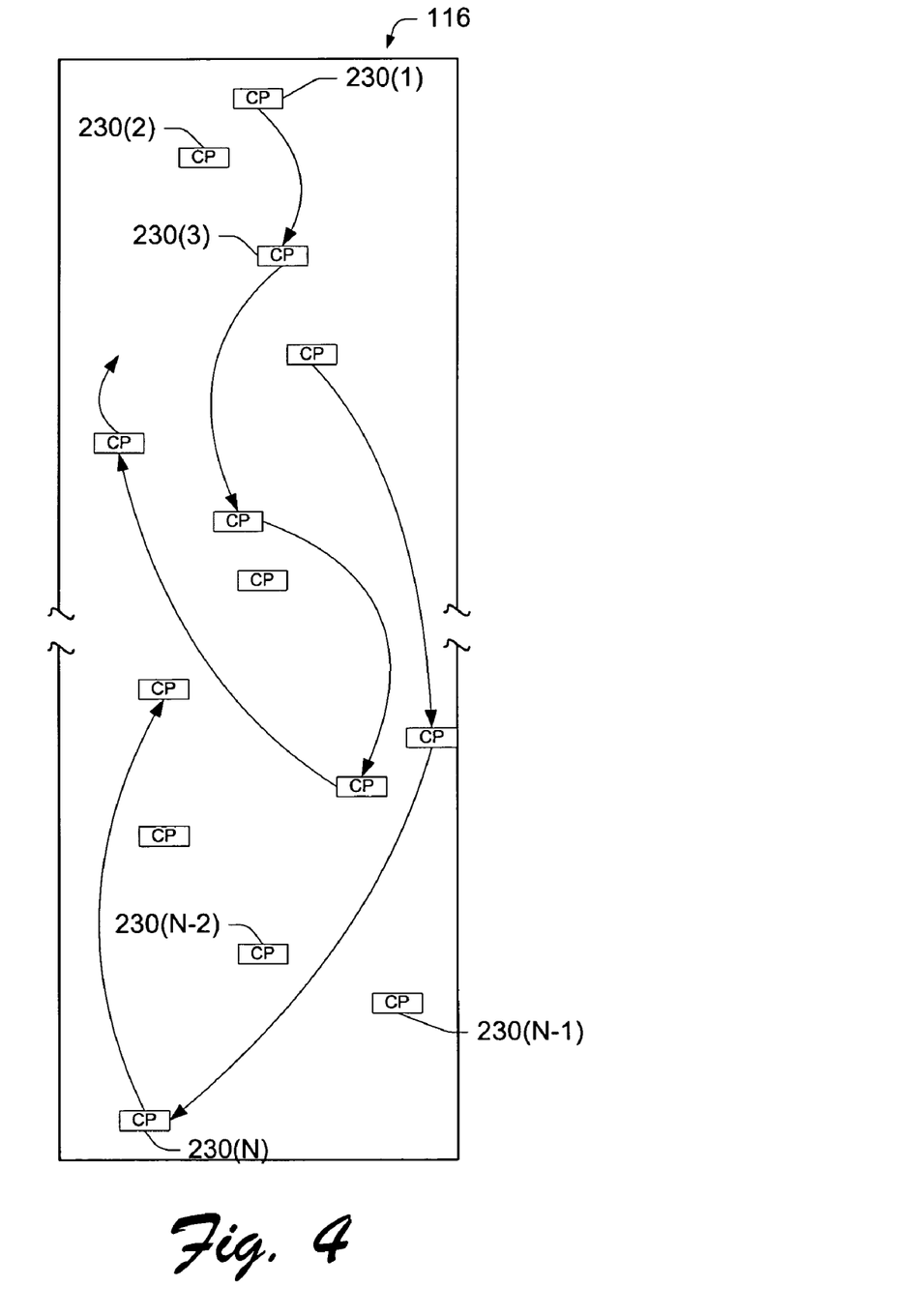
FIG. 4 shows an exemplary protected object as shipped to a client, and illustrates control flow through the object as a client-side evaluator evaluates the object for any sign of tampering.

FIG. 4 shows an exemplary protected object 116 as shipped to the client, and illustrates control flow through the object as client-side evaluator 134 evaluates the object 116 for any sign of tampering. The protected object 116 has multiple checkpoints 230(1), 230(2), . . . , 230(N) spread throughout the object. When executing the object 116, evaluator 134 passes through the various checkpoints 230(1)–230(N) to determine whether the checks are valid, thereby verifying the authenticity of the protected object.

If any checkpoint fails, the client is alerted that the object may not be authentic. In this case, the client may refuse to execute the object or disable portions of the object in such a manner that renders it relatively useless to the user.

Figure 5:
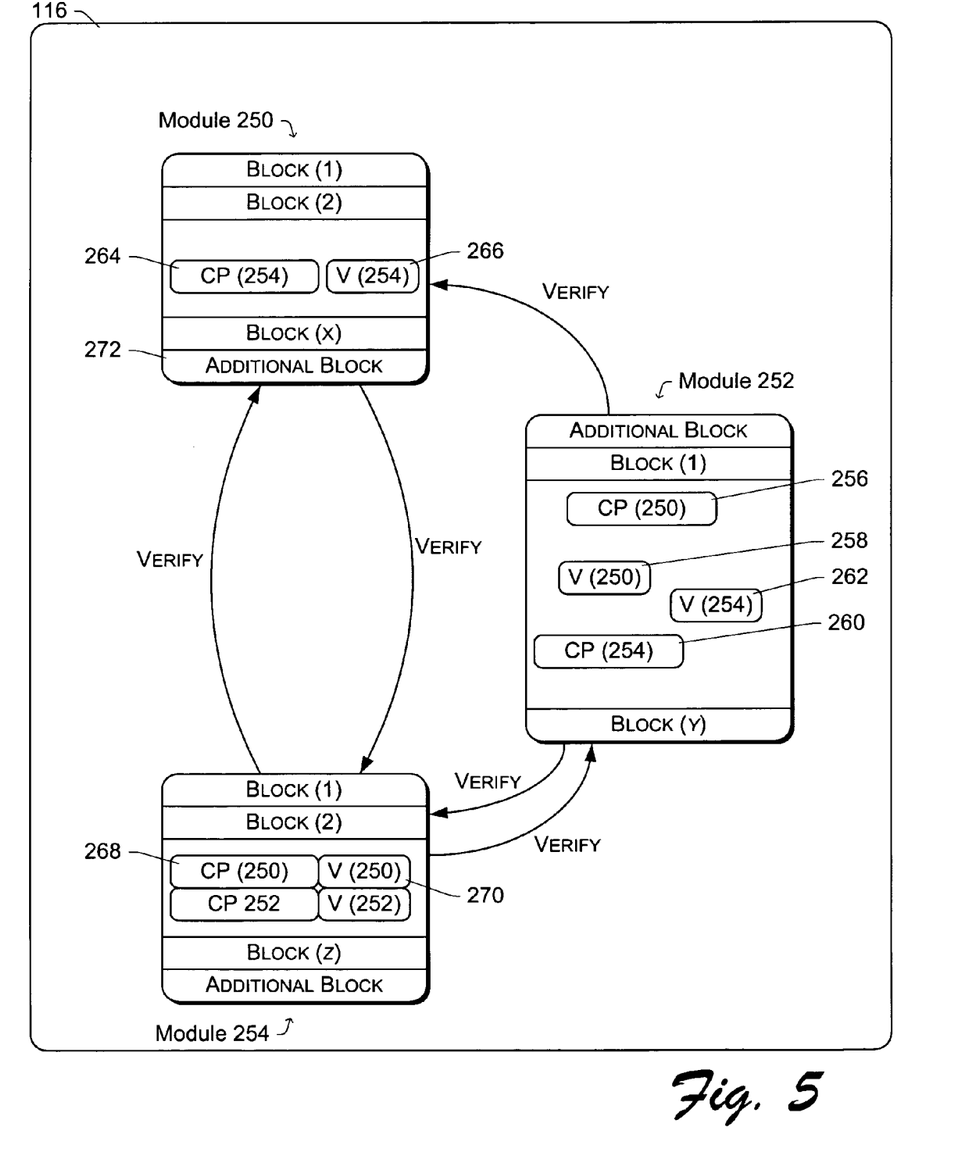
FIG. 5 shows another exemplary protected object partitioned into multiple modules.

FIG. 5 shows another exemplary protected object 116 partitioned into multiple segments or modules. Although object 116 may have a large number of modules, for ease of explanation only three modules 250, 252, and 254 are shown. A verification cycle is created in object 116, with module 250 verifying module 254, module 254 verifying module 252, and module 252 verifying module 250. One module verifying another module refers to the one module (also referred to herein as a "checker" module) including both a checkpoint that identifies which module is to have its integrity verified and a checkpoint value corresponding to that module. The checkpoint value is a value that is inserted into the checker module by integrity verification tool 122 of FIG. 1 and that can be re-calculated by evaluator 134, as discussed in more detail below.

Additional verification is also performed, with module 254 also verifying module 250 and module 252 also verifying module 254. Any module in object 116 can verify the integrity of (be a checker module for) any other module (including itself) in the object. As the number of checks (verifications) increases, so to does the difficulty faced by a malicious user in removing all of the checks increase. In order to verify the integrity of protected object 116, each of these integrity verifications should be satisfied.

Each module of a protected object can check any one or more other modules in the object. This allows for a very large number of checks within the object. However, if each module checks at most only one other module, then the number of checks would not exceed k checks, where k represents the number of modules in the object. In one implementation, the number of checks should not exceed the exponential value (exp) of k ($e^k$), where k represents the number modules in the object and e is the constant e (the base of the natural logarithm).

Verification of the integrity of a particular module occurs at a checkpoint. In the illustrated example, each module 250–254 that is verifying the integrity of another module includes a checkpoint (CP) for each module it is verifying. Each checkpoint also has a corresponding checkpoint value (V), which is the value that is obtained by applying a cryptographic message authentication code (MAC) or hash function to the module being verified. This value is included in the module performing the verification along with the checkpoint. For example, module 252 includes a checkpoint 256 and checkpoint value 258 for module 250, as well as a checkpoint 260 and checkpoint value 262 for module 254.

The checkpoints and checkpoint values can be located anywhere within the module. They may be stored entirely within one block (discussed in more detail below) or alternatively separated over multiple blocks. Additionally, the checkpoint and checkpoint value may be stored together (e.g., as illustrated in module 254) or alternatively separate (e.g., as illustrated in module 252).

Using a MAC or hash function to generate a checkpoint value for a module being verified allows the integrity of the module to be verified because any change (e.g., even of one byte) by a malicious user will result in a different checkpoint value (and thus any changes by the malicious user detected). However, this is troublesome for cyclic verification as illustrated in FIG. 5, because the verification of one module relies on the addition of a checkpoint value in another module. For example, assume that the checkpoint value for module 254 is generated and stored in module 252, then the checkpoint value for module 252 is generated and stored in module 250, and then the checkpoint value for module 250 is generated and stored in module 254. This would change the checkpoint value generated for module 254 as stored in module 252, which would change the checkpoint value generated for module 252 and stored in module 250, etc.

As discussed in more detail below, such cyclic verification can be performed by setting aside and using some "free" space inside modules. This space is part of the code bytes verified by the checkpoint value computation. If a particular checkpoint value is incorrect, the code bytes stored in the extra space can be changed until the checkpoint value becomes proper.

Figure 6:
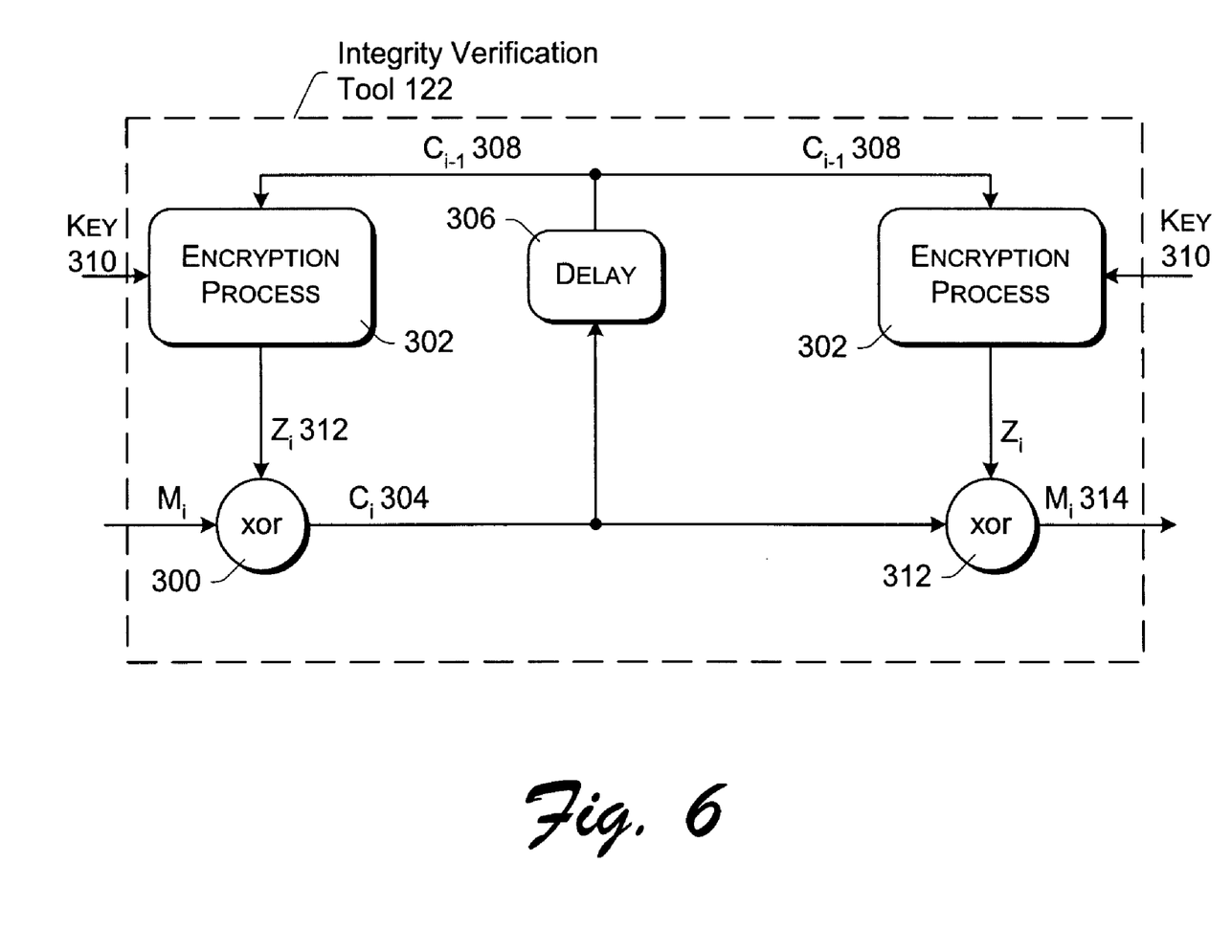
FIG. 6 illustrates an exemplary data flow for an integrity verification tool in generating checkpoint values.

FIG. 6 illustrates an exemplary data flow for integrity verification tool 122 of FIG. 1 in generating checkpoint values. The checkpoint value generation process of FIG. 6 is described with reference to FIG. 5 and specifically with reference to modules 250 and 254. It is to be appreciated, however, that the process is repeated for each checkpoint value being generated.

Multiple blocks (e.g., 64-bit blocks) are identified in each module 250 and 254. Every bit in the module may be included in one or more blocks, or alternatively some portions of the module may not be included in any block. These blocks can be overlapping or non-overlapping (or a combination thereof). The number of blocks in a module can vary between different objects and between different modules within the same object, and the size of blocks can vary between different objects, between different modules, and between blocks within the same module. One or more of these blocks in module 250 includes the checkpoint 264 indicating to verify module 254 and the checkpoint value 266 indicating the value that should be generated based on module 254. Similarly, one or more blocks in module 254 includes the checkpoint 268 indicating to verify module 250 and the checkpoint value 270 indicating the value that should be generated based on module 250.

Generation of the checkpoint value 270 for module 250 is performed based on the individual blocks of module 250. The blocks of module 250 are accessed individually by integrity verification tool 122 and an exclusive-or (xor) operator 300 performs a bit-by-bit xor operation based on the bits in the module and a set of bits received from an encryption process 302 (discussed in more detail below). Integrity verification tool 122 can access the blocks in any order (e.g., in the order they appear in module 250, a pseudo-random order, etc.), so long as that order is known by (or made known to) evaluator 134.

The output 304 of xor operator 300 is input to a delay buffer 306, which in turn outputs the delayed value 308 to encryption process 302. Encryption process 302 is any of a variety of well-known symmetric block ciphers (such as DES, LC4, LC5, etc.) that operates based on a secret key 310. The output 312 of encryption process 302 is also input to xor operator 300. Exclusive-or operator 300 thus generates an exclusive-or output based on a block of message 250 and the previous output of operator 300 (after being encrypted). For the first block of message 250, process 302 outputs a value known to both tool 122 and evaluator 134 (e.g., all 0's, all 1's, alternating 0 and 1, etc.). The output 304 of operator 300 when the final block of module 250 is input to operator 300 is used as the original MAC value (also referred to as the original hash value or original checkpoint value) for module 250.

This process is then repeated for module 254, generating an original MAC value for module 254. After the original MAC values for each of the modules 250 and 254 is generated, the original MAC value for module 250 is stored in module 254 as checkpoint value 270 and the original MAC value for module 254 is stored in module 250 as checkpoint value 266. This storage of the original MAC values occurs after the original MAC values for each module are generated.

In the illustrated example of FIG. 5, the checkpoint values 266 and 270 are stored within blocks of modules 250 and 254, respectively, that are used in generating the original MAC values. For generation of the original MAC values, default values (e.g., all 0's or all 1's) can be stored in these areas and then overwritten when the original MAC values are stored. Alternatively, an additional block(s) could be added to each of the modules and the original MAC values stored in these added blocks.

Integrity verification tool 122 then repeats the checkpoint value generation process with the newly modified (to include the original MAC values) modules 250 and 254, resulting in new MAC values for both modules 250 and 254. As the content of module 250 has changed, the new MAC values will differ from the old MAC values. An additional block is then added to each of modules 250 and 254 to offset the values that were added as the original MAC values. The additional block for module 250 is chosen to include content that offsets the changes made to block 250 when checkpoint value 266 was added. Thus, when evaluator 134 verifies module 250, the resultant checkpoint value that evaluator 134 generates (based on all the blocks, including the additional "offset" block that was added) will equal the original MAC value stored as checkpoint value 270. Similarly, when evaluator 134 verifies module 254, the resultant checkpoint value that evaluator 134 generates (based on all the blocks, including the additional "offset" block that was added) will equal the original MAC value stored as checkpoint value 266.

An additional block 272 is added to module 250 and an additional block 274 is added to module 254. Although blocks 272 and 274 are illustrated as being added to the end of the module, alternatively they may be located in any of a variety of locations. For example, an additional block may be added to the beginning of the module (e.g., block 276 of module 252) or elsewhere within module 252.

The content for the additional offset block can be generated in a variety of different manners. In one implementation, the value is generated by inputting the new MAC value into encryption process 302 (e.g., via delay element 306), where the new MAC value is encrypted based on secret key 310. The encrypted value is then input to xor operator 312 along with the original MAC value. Operator 312 performs a bit-by-bit exclusive-or operation of these two inputs, which results in an output block 314. Output block 314 identifies the content of the additional block that is to be added to the module. Alternatively, other processes could be used to identify the content of the additional block, such as trial and error, etc.

Care should be taken in the selection of content for the additional block so that the added block does not alter the functionality of the module (and thus of the object). By way of example, the additional block could be a data block, a No Operation instruction, a Jump instruction to the next instruction, or some other instruction(s) that does not alter the functionality of the module. In some situations (e.g., use of a Jump instruction to jump over the added content), the additional instruction(s) (e.g., Jump) are added prior to determining the content for the additional block (and prior to generating the new checkpoint value), so that the additional instruction(s) are part of the change to the module that is compensated for by the additional block. These additional instructions can be added, for example, as more block(s) in the module (in addition to the additional block added to compensate for changes to the module).

Now also referring to FIG. 1, when the protected content is subsequently transferred to client 104 via distribution channel 106, the verification process performed by evaluator 134 is similar to that performed by integrity verification tool 122. To verify module 250, evaluator 134 starts with the first block of module 250, inputting the block to an operator 300. The resultant value is then delayed and input to an encryption process 302 (which is the same encryption process as was used by integrity verification tool 122, or alternatively is a different process that generates the same results given the same inputs) using secret key 310 (the same secret key as was used by integrity verification tool 122). This continues for each block of module 250 (in the same order as was performed by integrity verification tool 122), the output MAC value is obtained from inputting the last block into operator 300. This calculated MAC value is then compared to the original checkpoint value (stored as checkpoint value 270 in module 254). If the two match (are the same), then the integrity of module 250 is verified; otherwise, the integrity of module 250 is not verified.

A similar process is used for evaluator 134 to verify the integrity of module 254—a MAC value is generated and compared to the original checkpoint value for module 254 (stored as checkpoint 264 of module 250). If the two match, then the integrity of module 254 is verified; otherwise the integrity is not verified.

Although the above process is described with reference to adding additional blocks to each module that is checking the verification of another module, the process may alternatively add an additional block to fewer modules. For example, assume a cyclic verification loop is created where module 250 verifies the integrity of module 254, module 254 verifies the integrity of module 252, and module 252 verifies the integrity of module 250. In this situation, the MAC value for module 250 can be generated and stored in module 254, and the MAC value for module 254 can be generated and stored in module 252. The MAC value for module 252 can then be generated and stored in module 250, and then an additional block added to module 250 to offset the added MAC value (in the manner described above). Thus, with the additional block in module 250, the MAC value that is subsequently generated by evaluator 134 based on module 250 will match the MAC value stored in module 254, the MAC value that is subsequently generated by evaluator 134 based on module 254 will match the MAC value stored in module 252, and the MAC value that is subsequently generated by evaluator 134 based on module 252 will match the MAC value stored in module 250, even though an additional block has been added to only one of the three modules.

In the discussions above, the code integrity verification is described as primarily evaluating the shape of the code (that is, checking the code itself and verifying that it has not been altered). Alternatively, the behavior of the code may be evaluated rather than the shape. Evaluating the behavior of the code refers to evaluating values that change during execution of the code (e.g., dynamic values in certain registers). The generation of the MAC value may be altered to incorporate such values (either in addition to or in place of the shape of the code) to evaluate the behavior of the code during execution to verify that the code is executing properly. For example, instructions in the code may alter a particular register during execution in some known manner and the value(s) in this register incorporated into the MAC value generation process in any of a variety of manners (e.g., by adding the value in the register to the input or output of encryption process 302).

Figure 7:
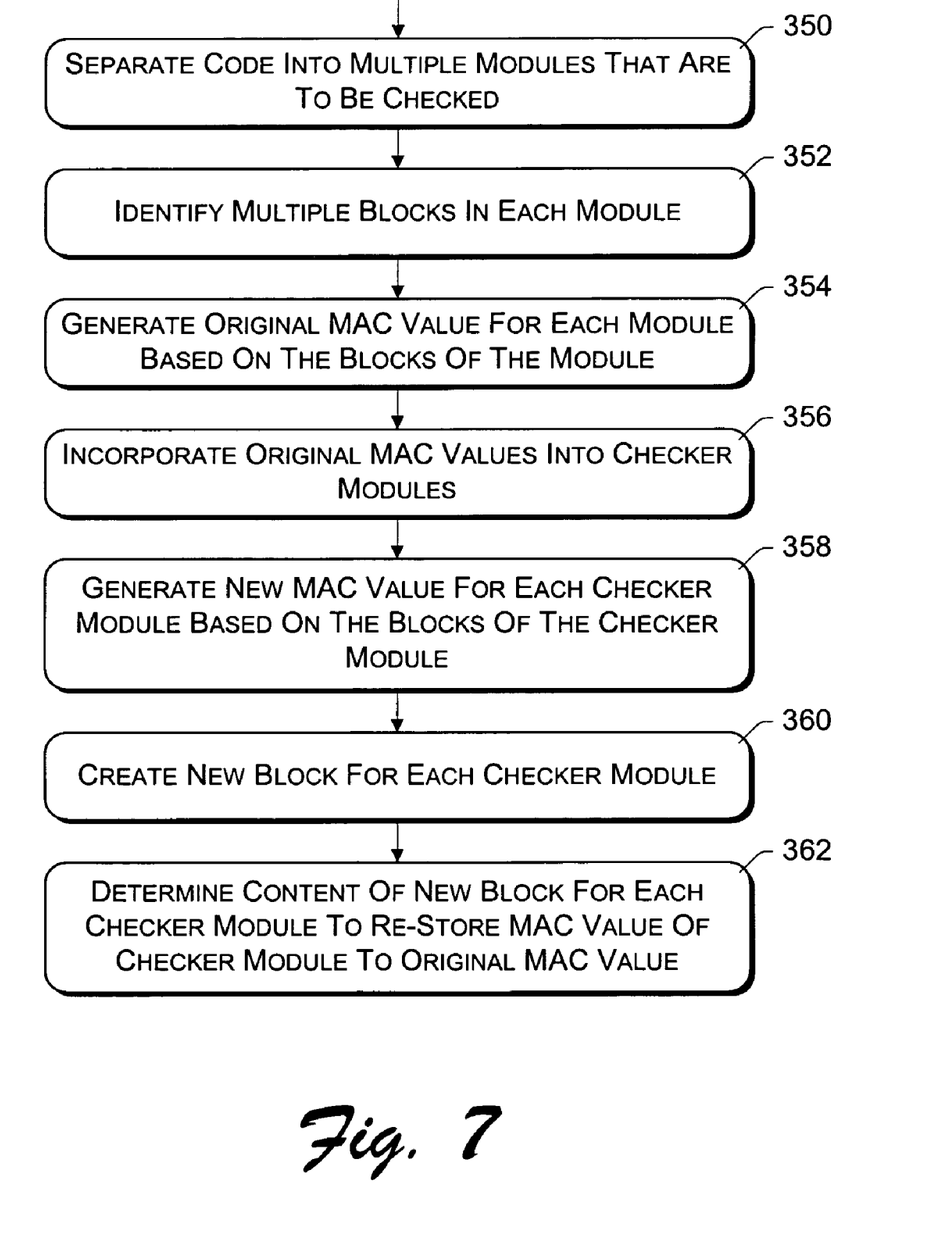
FIG. 7 is a flowchart illustrating an exemplary process for generating cyclic checkpoint values in accordance with certain embodiments of the invention.

FIG. 7 is a flowchart illustrating an exemplary process for generating cyclic checkpoint values in accordance with certain embodiments of the invention. In the illustrated example, the process of FIG. 7 is carried out by checkpoint calculator/inserter 212 (FIG. 3) of integrity verification tool 122 (FIG. 1), and may be performed in software.

Initially, the object that is to be protected is separated into multiple modules which are to have their integrity checked (act 350). Multiple blocks are then identified in each module (act 352) and an original MAC value is generated for each module based on the blocks of that module (act 354). The original MAC values are then incorporated into checker modules (act 356).

A new MAC value is then generated for each checker module based on the blocks of the checker module (act 358). This new MAC value is based on the blocks of the module after the original MAC value(s) has been added to the module. A new block is then created for each checker module (act 360). For each checker module, the content for the new block in that checker module is determined so as to re-store the MAC value of the checker module to the original MAC value (act 362).

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more processors, causes the one or more processors to perform acts including:
identifying a plurality of modules in a software program, wherein each module includes a plurality of blocks and wherein the plurality of modules includes checker modules;
for each of the plurality of modules,
generating an original checkpoint value, and
incorporating the original checkpoint value into a checker module; and
for each of the checker modules,
generating a new checkpoint value after the original checkpoint value has been incorporated into the checker module, and
determining a new block to add to the checker module to offset the incorporated original checkpoint value such that subsequent generation of a checkpoint value for the checker module equals the original checkpoint value for the checker module.

2. One or more computer readable media as recited in claim 1, wherein the incorporating comprises incorporating the original checkpoint value into multiple checker modules.

3. One or more computer readable media as recited in claim 1, wherein the generating comprises:
computing, based on the plurality of blocks of a module, a message authentication code (MAC) value to be used as the checkpoint value for the module.

4. One or more computer readable media as recited in claim 3, wherein the computing comprises:
inputting each of the plurality of blocks of the module into an exclusive-or operator that generates an output value by performing an exclusive-or operation on each block and an encrypted version of the previous output of the exclusive-or operator, and
using, as the message authentication code value, the output value from the exclusive-or operator obtained from inputting the last of the plurality of blocks into the exclusive-or operator.

5. One or more computer readable media as recited in claim 1, wherein the determining a new block comprises:
encrypting the new checkpoint value; and
determining, as the content of the new block, a value equal to the exclusive-or of the encrypted new checkpoint value and the original checksum value.

6. One or more computer readable media as recited in claim 1, wherein the new block does not alter the functionality of the module.

7. One or more computer readable media as recited in claim 1, wherein the new block comprises a data block.

8. One or more computer readable media as recited in claim 1, wherein the plurality of instructions, when executed, further causes the one or more processors to perform acts including adding, prior to generating the new checkpoint value, additional instructions to the module as part of one or more additional blocks, the additional instructions causing the addition of the new block to not alter the functionality of the module.

9. One or more computer readable media as recited in claim 1, wherein the software program further includes a plurality of checkpoints corresponding to the incorporated checkpoint values, wherein each checkpoint identifies when the integrity of the corresponding module is to be verified.

10. A method comprising:
identifying a plurality of segments in an object; and
applying cyclic integrity verification to the object based on the plurality of segments.

11. A method as recited in claim 10, wherein the cyclic integrity verification is applied to the plurality of segments by:
for each of the plurality of segments,
generating an original checkpoint value, and
incorporating the original checkpoint value into a checker segment; and
for each of the checker segments,
generating a new checkpoint value after the original checkpoint value has been incorporated into the checker segment,
determining an additional block to be added to the checker segment to offset the incorporated original checkpoint value such that subsequent generation of a checkpoint value for the checker segment equals the original checkpoint value for the checker segment.

12. A method as recited in claim 10, wherein the cyclic integrity verification is applied to verify the shape of the plurality of segments.

13. A method as recited in claim 10, wherein the cyclic integrity verification is applied to verify the behavior of the plurality of segments.

14. One or more computer-readable memories comprising computer-readable instructions that, when executed by a processor, direct a computer system to perform the method as recited in claim 10.

15. A method comprising:
identifying a plurality of segments in an object;
generating a checkpoint value for each of the plurality of segments;
storing the checkpoint value for each of the plurality of segments in another of the plurality of segments; and
modifying each of the plurality of segments so that the addition of the checkpoint value to the segment is offset and the checkpoint value for the segment remains the same.

16. A method as recited in claim 15, wherein the storing comprises storing the checkpoint value into multiple other segments of the plurality of segments.

17. A method as recited in claim 15, wherein the modifying comprises:
computing, based on a plurality of blocks of a segment, a message authentication code (MAC) value to be used as the checkpoint value for the segment; and
determining a new block to add to the segment to offset the stored checkpoint value such that subsequent generation of a checkpoint value for the segment equals the previously generated message authentication code value.

18. A method as recited in claim 17, wherein the computing comprises:
inputting each of the plurality of blocks of the segment into an exclusive-or operator that generates an output value by performing an exclusive-or operation on each block and an encrypted version of the previous output of the exclusive-or operator; and
using, as the message authentication code value, the output value from the exclusive-or operator obtained from inputting the last of the plurality of blocks into the exclusive-or operator.

19. A method as recited in claim 17, wherein the determining a new block comprises:

generating a new checkpoint value based on the plurality of blocks and including the stored checkpoint value;
encrypting the new checkpoint value; and
determining, as the content of the new block, a value equal to the exclusive-or of the encrypted new checkpoint value and the original checksum value.

20. A method as recited in claim 15, wherein the modifying does not alter the functionality of the segment.

21. A method as recited in claim 15, wherein the modifying comprises adding a new data block.

22. A method as recited in claim 15, wherein the object comprises a software program.

23. A method as recited in claim 15, further comprising storing a checkpoint corresponding to each checkpoint value, each checkpoint identifying when the integrity of the corresponding segment is to be verified.

24. One or more computer-readable memories comprising computer-readable instructions that, when executed by a processor, direct a computer system to perform the method as recited in claim 15.

25. A method comprising:
generating a verification value for a first segment of an object;
generating an original verification value for a second segment of the object;
adding, to the second segment, the verification value for the first segment; and
adding an offset value to the second segment so that a newly calculated verification value for the second segment equals the original verification value.

26. A method as recited in claim 25, wherein the generating the verification value for the first segment comprises generating the verification value based at least in part on behavior of the first segment during execution of the first segment.

27. A method as recited in claim 26, wherein the behavior of the first segment during execution includes modification of a register by one or more instructions in the first segment during execution.

28. A method as recited in claim 25, further comprising:
adding, to the first segment, the original verification value for the second segment; and
adding another offset value to the first segment so that a newly calculated verification value for the first segment equals the verification value for the first segment.

29. A method as recited in claim 25, wherein the generating the original verification value comprises:
computing, based on a plurality of blocks of the second segment, a message authentication code (MAC) value.

30. A method as recited in claim 29, wherein the computing comprises:
inputting each of the plurality of blocks of the second segment into an exclusive-or operator that generates an output value by performing an exclusive-or operation on each block and an encrypted version of the previous output of the exclusive-or operator; and
using, as the message authentication code value, the output value from the exclusive-or operator obtained from inputting the last of the plurality of blocks into the exclusive-or operator.

31. A method as recited in claim 25, wherein the adding an offset value comprises:
generating a new verification value for the second segment;
encrypting the new verification value; and
determining, as the offset value, a value equal to the exclusive-or of the encrypted new verification value and the original verification value.

32. A method as recited in claim 25, wherein the offset value does not alter the functionality of the module.

33. A method as recited in claim 25, wherein the offset value comprises a data block.

34. A method as recited in claim 25, wherein the object comprises a software program.

35. A method as recited in claim 25, further comprising storing a checkpoint, corresponding to the verification value, that identifies when the integrity of the first segment is to be verified.

36. A method as recited in claim 35, further comprising storing the checkpoint in the second segment.

37. One or more computer-readable memories comprising computer-readable instructions that, when executed by a processor, direct a computer system to perform the method as recited in claim 25.

38. One or more computer-readable media having stored thereon a computer program including:
a plurality of segments, each including one or more checkpoint values to be used to verify the integrity of one or more other segments; and
wherein the plurality of segments further include a plurality of checkpoints that identify a circular ordering of verifying the integrity of the segments.

39. One or more computer-readable media as recited in claim 38, wherein each of the checkpoint values is message authentication code (MAC) value based on the one or more other segments.

40. One or more computer-readable media as recited in claim 38, wherein each of the plurality of segments includes a checkpoint value to be used to verify the integrity of each of the other of the plurality of segments.

41. A production system, comprising:
a memory to store an original program; and
a production server equipped with a cyclic integrity verification protection tool that is used to augment the original program for protection purposes, the production server being configured to parse the original program into a plurality of segments and apply cyclic integrity verification to the plurality of segments.

42. A production system as recited in claim 41, wherein the cyclic integrity verification is applied to the plurality of segments by:
for each of the plurality of segments,
generating an original checkpoint value, and
incorporating the original checkpoint value into a checker segment; and
for each of the checker segments,
generating a new checkpoint value after the original checkpoint value has been incorporated into the checker segment, and
determining an additional block to be added to the checker segment to offset the incorporated original checkpoint value such that subsequent generation of a checkpoint value for the checker segment equals the original checkpoint value for the checker segment.

43. A production system as recited in claim 42, wherein the cyclic integrity verification is applied to the plurality of segments by further including a plurality of checkpoints corresponding to the incorporated checkpoint values, wherein each checkpoint identifies when the integrity of the corresponding segment is to be verified.

44. A client-server system, comprising:
a production server to apply cyclic integrity verification to a program to produce a protected program; and
a client to store and execute the protected program, the client being configured to evaluate the protected program to determine whether the protected program has been tampered with.

* * * * *